United States Patent [19]

Okuyama

[11] 4,290,628
[45] Sep. 22, 1981

[54] PASSIVE SEAT BELT EQUIPMENT
[75] Inventor: Hiroo Okuyama, Yokohama, Japan
[73] Assignee: Nissan Motor Co., Ltd., Yokohama, Japan
[21] Appl. No.: 101,240
[22] Filed: Dec. 7, 1979
[30] Foreign Application Priority Data
  Dec. 20, 1978 [JP] Japan .................. 53-160477
[51] Int. Cl.³ ............................................. B60R 21/02
[52] U.S. Cl. .................................................. 280/803
[58] Field of Search ............... 280/803, 802, 804, 805, 280/806, 807, 808

[56] References Cited
U.S. PATENT DOCUMENTS
  3,679,229  7/1972  Weststrate ..................... 280/803
  3,754,776  8/1973  Cataldo ......................... 280/803
  3,915,473 10/1975  Lindblad ........................ 280/802
  4,168,850  9/1979  Stephenson .................... 280/803
  4,201,401  5/1980  Brynn .......................... 280/803

Primary Examiner—Robert R. Song

[57] ABSTRACT

A passive seat belt equipment for a motor car comprises a lap belt stretched between one end coupled with a retractor mounted inside of a rear bottom portion of a door and the other end fixed on a rear top portion of the door through a ring engaged with a buckle fitted on a central portion of a floor, and an auxiliary belt stretched between one end connected with another ring though which the lap belt is stretched and the other end coupled with the retractor through a slit formed on the top portion of the door. As a result thereof, the lap belt which is loosened as the door is opened is lifted up automatically by the ring engaged with the auxiliary belt which is wound up as the door is opened, so as to facilitate getting in and out of the car.

2 Claims, 6 Drawing Figures

PASSIVE SEAT BELT EQUIPMENT

BACKGROUND OF THE INVENTION

1. Field of the Invention

The present invention relates to a passive seat belt equipment used for a motor car in which a seat belt can be put on and off automatically when closing and opening the door respectively.

2. Description of the Prior Art

A conventional equipment of the above kind is shown in FIG. 1.

In Fig. 1, an end 2 of a belt 1 is fixed on a rear bottom portion of a door 3 and the other end 4 thereof is fixed on a rear top portion of the door 3, and the belt 1 is stretched between these ends through rings 6 and 8 which are connected with ends of a wire 5 and a belt 7 respectively. The other end of the belt 7 is coupled with a retractor 9 which is connected with a central portion of a car body, for instance, with a seat 10 or a tunnel forming a part of a floor, while the other end of the wire 5 is coupled with a motor 11 which is installed inside of an instrument or dash board. When the door 3 is opened, a door switch 12 operates to drive the motor 11, so as to wind up the wire 5. As a result thereof, the belts 1 and 7 are lifted upwards and forwards, so as to facilitate getting in and out of the car by preventing these belts from catching the legs of a passenger.

However, the above mentioned conventional equipment has defects of having poor reliability and high expense based on the employment of electric parts, that is, the motor 11 and the door switch 12. Moreover, it has such defects that the wire 5 used therefor interferes with the putting on the seat belt 1 and reduces the trade-in value of the car because the arrangement is ugly.

SUMMARY OF THE INVENTION

An object of the present invention is to provide a passive seat belt equipment which has a simple and inexpensive structure including no unreliable electric parts in view of the above defects of the conventional equipment.

In a passive seat belt equipment according to the present invention, a continuous lap belt is stretched between one end thereof coupled with a retractor which is mounted inside of a rear bottom portion of a door and the other end fixed on a rear top portion of the door through a ring which in engaged with a buckle fitted on a central portion of a floor, and an auxiliary belt is stretched between one end connected with another ring, through which the lap belt is stretched, and the other end coupled with the above retractor in such a way that, when the lap belt is wound up, the auxiliary belt is loosened and vice versa, through a slit formed on the top of the door. As a result thereof, the lap belt which is loosened as the door is opened is lifted up automatically by the ring engaged with the auxiliary belt which is wound up as the door is opened, so as to facilitate getting in and out of the car.

The present invention will be explained in more detail with reference to the embodiment shown in the accompanied drawings.

DESCRIPTION OF THE PREFERRED EMBODUMENT

Figure 1:
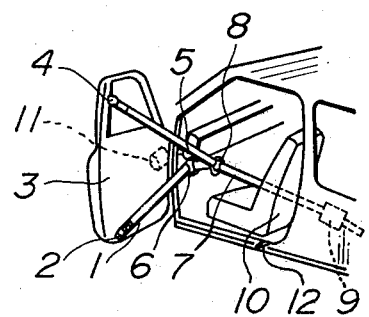
FIG. 1 is a perspective view showing an example of a conventional equipment as mentioned above.
Figure 2:
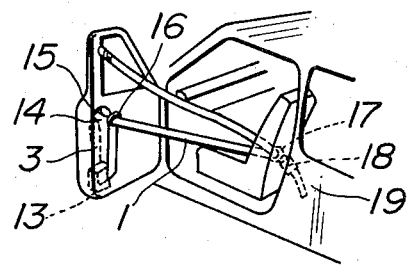
FIG. 2 is a perspective view showing a preferred embodiment of a passive seat belt equipment according to the present invention.
Figure 3:
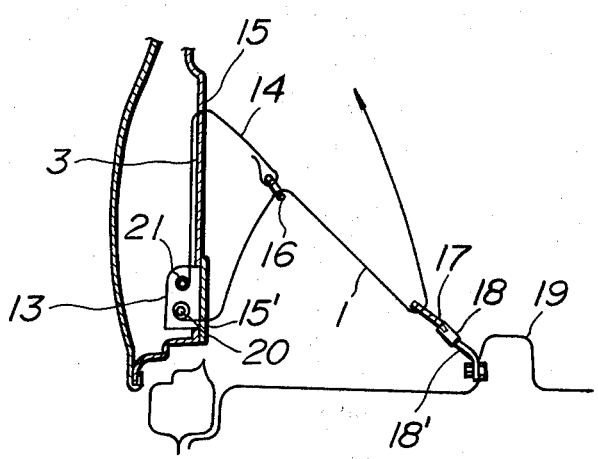
FIG. 3 is a transverse cross section showing the above embodiment.

In the preferred embodiment shown in FIG. 2 and so on, the portions represented by the same numerals as those in FIG. 1 are just the same as in the conventional equipment, so that the explanation thereof is omitted.

In these drawings, 13 is a retractor of emergency lock type, which is installed inside of the rear bottom portion of the door 3 and with which one end of the continuous lap belt 1 is coupled, 14 is a narrow auxiliary belt, one end of which is coupled with the retractor 13 in such a way as described later and the other end of which is connected with a through ring 16 outside of the door 3 through a slit 15 formed thereon. The other end of the continuous lap belt 1 is fixed on the upper rear portion of the door 3 behind a sash thereof through the above through ring 16 and a through tang 17. The through tang 17 is engaged removably with a buckle 18 which is fitted on the tunnel portion 19 of the car body through a bracket 18'. The buckle 18 and the through tang 17 are coupled with each other and can be removed from each other in case of an emergency.

Figure 4:
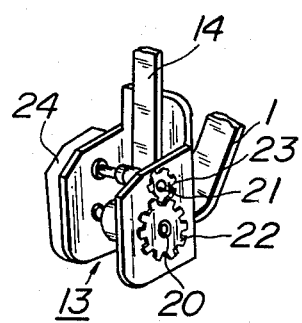
FIG. 4 is a perspective view showing a retractor portion of the above embodiment.

In the above mentioned retractor 13, as shown in FIG. 4, a first rotating shaft 20, which acts as a winder for winding up the continuous lap belt 1, and a second rotating shaft 21, which acts as another winder for winding up the auxiliary belt 14 are provided together with a transmission means for coupling these shafts 20, 21 with each other, which means consists of gears 22, 23 contacting each other and being secured on these shafts 20, 21 respectively. Furthermore, in a case 24 accompanying the retractor 13, a spring (not shown) for energizing the rotating shaft 20 in the direction of winding up similarly as in the conventional equipment and an emergency locking mechanism (not shown) for locking the rotating shaft 20 in case of emergency are provided.

By the way, the fixing position on which the continuous lap belt 1 is fixed is not necessarily restricted to the aforesaid rear top portion of the door 3, but can be settled on a roof side rail of the car body, and a numeral 15' represents another slit formed on the door 3 for passing the continuous lap belt 1 therethrough.

In the next place, the operation of the preferred embodiment of the present invention, which is constituted as mentioned above, will be explained particularly by referring to FIGS. 5 and 6.

Figure 5:
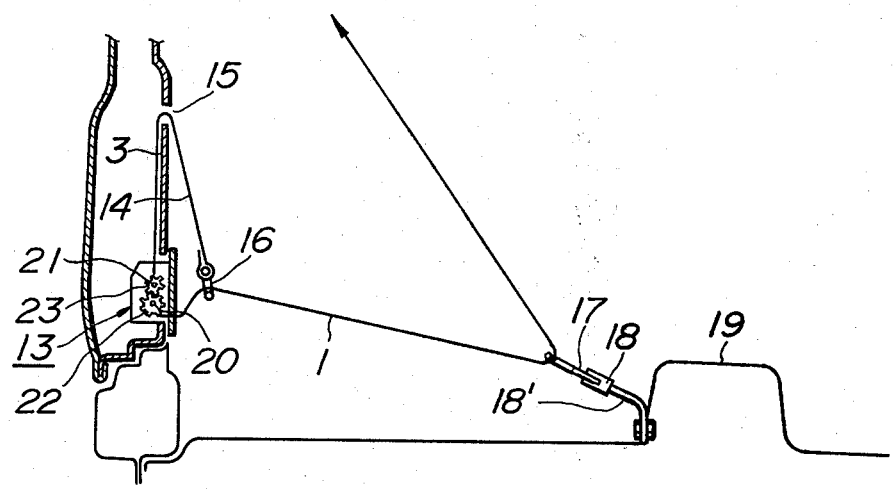
FIG. 5 is a transverse cross section showing a state of the above embodiment in which a door of a car is closed.

In the state in which the door 3 is closed as shown in FIG. 5, the retractor 13 energizes the rotating shaft 20 in the direction of winding up the continuous belt 1, the portion thereof acting as the lap belt is pulled downwards so as to fit on a body of a passenger being seated on the seat 10. Accordingly, it is required that the amount of pulling out of the auxiliary belt 14 is settled in such a manner that the through ring 16 connected with the end of the auxiliary belt 14 is positioned near the outlet of the retractor 13 which is installed inside of the rear bottom portion of the door 3 by means of setting the state of contact between the gears 22 ans 23 appropriately.

Figure 6:
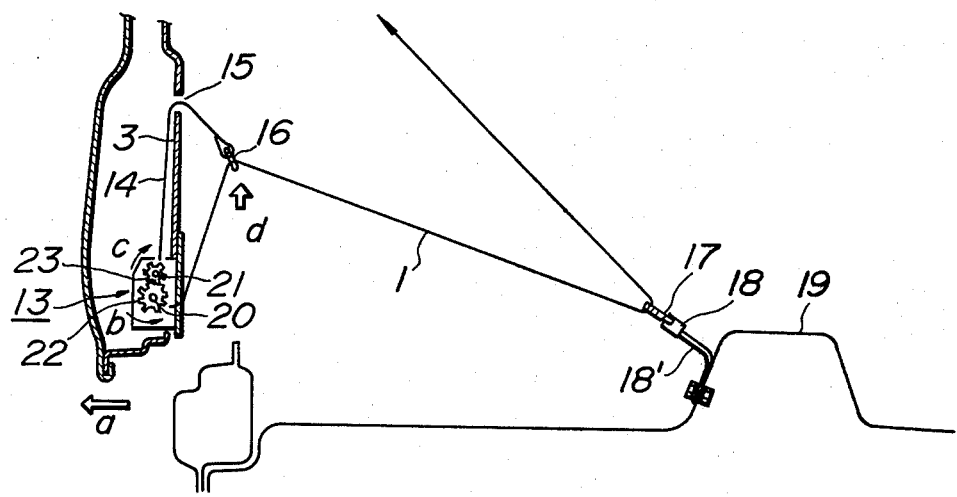
FIG. 6 is a transverse cross section showing a state of the above embodiment in which the door of the car is opened.

On the other hand, in the state in which the door 3 is opened in the direction indicated by an arrow mark "a" as shown in FIG. 6, the continuous belt 1 is pulled out as the door 3 is opened, since the upper end thereof is fixed on the upper rear portion of the door 3 behind the sash thereof, the middle portion thereof is engaged with the through tang 17 which is coupled with the buckle 18 fitted on the tunnel portion 19 of the car body, and the lower end portion which is coupled with the retractor 13 is stretched out against the spring action of the retractor 13 as the door 3 is opened. As the end portion of the continuous belt 1 is stretched out, the first rotating shaft 20, around which the end portion of the continuous belt 1 is wound, rotates in the direction indicated by the arrow mark "b", that is, counterclockwise together with the gear 22, which drive the gear 23 to rotate in the direction indicated by the arrow mark "c", that is, clockwise together with the second rotating shaft 21. Consequently, the second rotating shaft 21 winds up the auxiliary belt 14, as the door 3 is opened.

As a result thereof, the through ring 16 is lifted upwards as the auxiliary belt 14 is wound up, and then is pulled forwards as the door 3 is opened, so that the continuous belt 1 is shifted upwards and forwards from the seat 10, so as to prevent the lap belt 1 from being caught by the legs of the passenger and consequently to facilitate getting in and out of the car.

On the contrary, as the door 3 is closed, the lower end portion of the continuous belt 1 is wound up under the spring action of the retractor 13, so as to pull the continuous belt 1 into the inside of the door 3. As a result thereof, the through ring 16 connected with the auxiliary belt 14, which is pulled out as the door is closed, is lowered as shown in FIG. 5, and consequently the portion of the continuous belt 1, which portion acts as the lap belt, is lowered, so as to fit to the trunk portion of the passenger.

As will be apparent from the above, it is possible according to the present invention to provide an extremely reliable passive seat belt equipment used for a motor car, since no unreliable electric parts as used in the conventional equipment are employed at all, but only the spring action of the conventional retractor of emergency lock type is used. Moreover, it is also possible to minimize the structure of the equipment, since the coupling means, for instance, rotating shaft and gears, which are required for the cooperation of the lap belt and the auxiliary belt according to the present invention are included in the retractor. Furthermore, various other effects, such better appearance, increased trade-in value and low cost can be obtained, since, it is not required on account of utilizing the auxiliary belt which is coupled with the door, to stretch a wire between the seat and the dash board as used in the conventional equipment.

What is claimed is:
1. a passive seat belt equipment for a vehicle comprising;
   a buckle to be connected to a central portion of a floor or to a seat of the vehicle,
   a lap belt which is stretched between one end thereof coupled with a retractor to be installed inside of a rear bottom portion of a door of the vehicle and the other end thereof to be fixed on a rear top portion of the door through a ring having a tang which is coupled with said buckle,
   an auxiliary belt which is stretched between one end thereof connected with a through ring through which said lap belt is stretched and the other end thereof coupled with a winding member to be installed inside of the door through a slit formed on the door above said retractor, and
   a transmission means which is interposed between said retractor and said winding member so as to force said winding member to do reverse action against the winding and rewinding of said retractor respectively.
2. A passive seat belt equipment as claimed in claim 1, wherein said transmission means consists of a combination of gears.

* * * * *